June 17, 1958 D. M. KALTENBACHER 2,839,750
A. G. C. DEGENERATIVE CONTROL MEANS
Filed Nov. 21, 1952
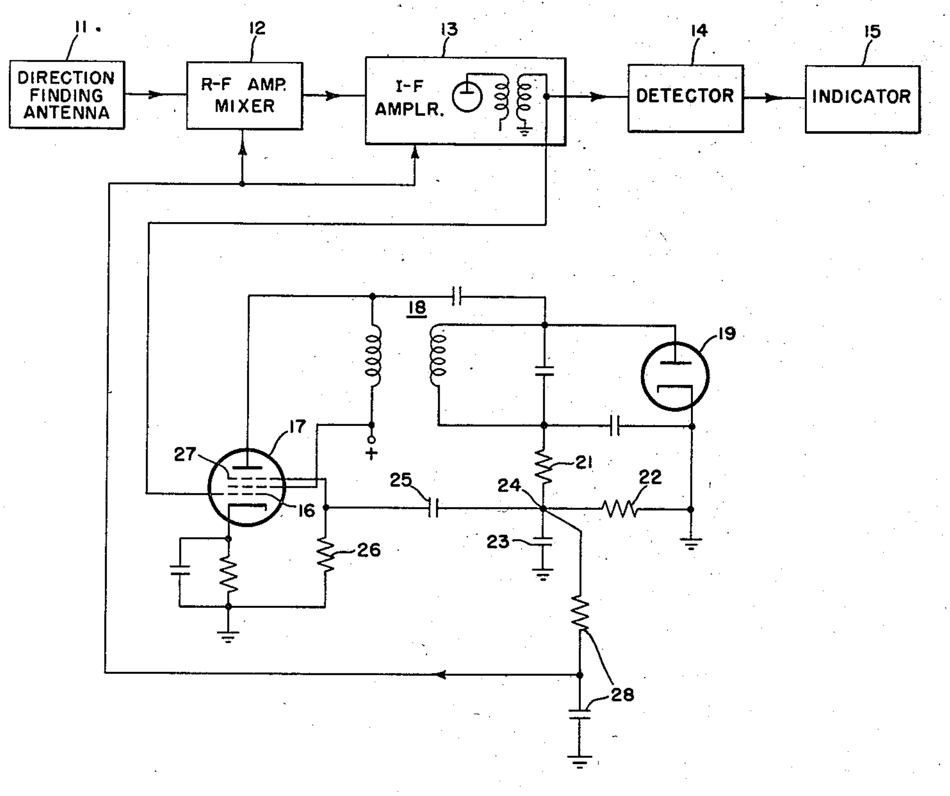
DOMINIC M. KALTENBACHER
*INVENTOR.*
*BY*
Hillman, Kerst and Pfund
ATTORNEYS United States Patent Office 2,839,750

Patented June 17, 1958

2,839,750

A. G. C. DEGENERATIVE CONTROL MEANS

Dominic M. Kaltenbacher, Baltimore, Md., assignor to Bendix Aviation Corporation, Towson, Md., a corporation of Delaware Application November 21, 1952, Serial No. 321,839

7 Claims. (Cl. 343—115)

This invention relates to signal translators and more particularly to improved arrangements of signal translators for obtaining desired translating characteristics.

The invention is well adapted for use with sensitive radio receivers and will be described with reference to a direction finding system employing such a receiver. The invention is not limited to such systems or receivers but is of general utility for achieving desired control characteristics.

Signal translators, such as radio receivers, for example, are well known wherein the amplified signal level is employed to generate a control potential for modifying the gain of one or more of the amplifier stages translating the signal. When amplitude modulation appears on a received signal it is generally required that the modulation components in the control potential be removed or reduced in magnitude to prevent the alteration of the modulated character of the signal. These modulation components can be reduced in magnitude by well known filter techniques which are satisfactory for many applications. In certain instances, however, it is not feasible for economic or practical reasons to remove one or more modulation components or a band of such components from the control potential by means of ordinary passive filters. When such signal components remain in the control potential which is applied for automatic gain control of a signal amplifier, the modulated character of the amplified signal output thereof will be modified with the concomitant degradation of signal information.

Accordingly, it is an object of the present invention to provide improved translating characteristics in a signal translator.

Another object is to provide improved characteristics for a signal amplifier by means of selective degenerative operation.

A further object is the provision of improved filtering for automatic gain controlled amplifiers by degenerative means.

Another object is to provide improved arrangements for removing certain signal components from automatic gain control potentials.

These and other objects of the present invention are achieved by providing, in the preferred embodiment thereof, an amplified automatic gain control channel having selective degenerative operation. In automatic direction finding systems in which the present invention finds particular application an antenna system is provided with a rotating directive pattern. For a geographically fixed source, the signal amplitude applied by the antenna system to the input terminals of a receiver will have maxima and minima in accordance with the antenna pattern and the rotational position thereof. For continuous rotation of the antenna pattern, these fluctuations effect an amplitude modulation of relatively low frequency, of the order of 15 or 30 cycles per second, depending upon the antenna pattern and the angular velocity thereof. The demodulation of this low frequency component permits the accurate determination of the direction of arrival of the radio wave from the phase of the null points in the modulation envelope. The presence of this modulation signal in the automatic gain control voltage seriously impairs the quality with which direction can be measured. To remove such low frequencies by conventional filter techniques, however, results in undesirable characteristics of the receiver for the rapid variations in radio field strength which are encountered. The present invention provides desirable automatic gain control characteristics without impairing the directional information or other intelligence received.

In the single figure a radio direction finding system employing one form of the invention is shown.

The radio direction finding system provides an antenna 11 having a rotatable directional pattern with well defined null points. Signals of any desired carrier frequency are selected by tuning R. F. amplifier and mixer stages 12 and the selected signal is converted to the intermediate frequency. An I. F. amplifier 13 amplifies the I. F. signal and supplies a detector 14 and indicator 15 in any conventional manner.

The I. F. signal is also applied to grid 16 of an automatic gain control amplifier 17. The output of the amplifier 17 is coupled by an I. F. network 18 to a diode detector 19. The rectified output of the diode 19 appears across resistors 21, 22. Certain of the modulation frequencies are eliminated by selective filtering, such as that obtained with the resistors 21, 22 and capacitor 23 which may be proportioned, for example, to remove audio and higher frequency components. Any alternating signal components remaining at junction 24 are applied by means of a suitable network 25, 26 to a control electrode 27 of the tube 17. This arrangement permits the degeneration of the particular modulation components in the I. F. network 18 which are due to antenna rotation to negligible proportions by coupling the detected portions of such components appearing at the junction 24 to the grid 27. The automatic gain control potential may be coupled from a suitable point, such as the junction 24, to the preceding stages 12, 13 with a filter 28, if desired.

When receiving substantially steady signals, such as those encountered in an ordinary communication receiver, tube 17 operates as a conventional AGC amplifier. Upon the introduction of fluctuations having frequency components which are difficult to remove by practicable filter arrangements, the circuit of the present invention provides the substantial elimination of such components from the AGC potential without impairing the function of the amplified AGC circuit.

Obviously, other arrangements than those shown and described could be devised in the light of the present teaching for practicing the invention and are to be understood as being within the scope thereof.

What is claimed is:

1. A signal translating system comprising a main signal channel with a utilization device and an auxiliary signal channel, means responsive to signal variations in said auxiliary channel for modifying the translating characteristic of said main signal channel, and degenerative means in said auxiliary channel selectively responsive to predetermined frequency components of said signal for diminishing said frequency components in said auxiliary channel, said degenerative means comprising a degenerative feedback loop having frequency selective filtering means incorporated therein.

2. A modulated signal amplifying system comprising a main signal amplifying channel with a modulation utiliz-device and an auxiliary modulated signal amplifying channel, an amplitude detector for said auxiliary channel, filter means for removing certain frequency components from the output of said detector, means for controlling he gain of said main ampilfier channel in accordance with he magnitude of the filtered output of said detector, and neans in said auxiliary channel responsive to modulation requency components from said detector for degeneratively controlling the gain of said auxiliary channel n synchronism with the amplification therein of said nodulated signal.

3. A modulated signal amplifying system comprising ι main signal amplifying channel with a modulation utilizing device and an auxiliary modulated signal amplifying channel, an amplitude detector for said auxiliary channel, ilter means for removing certain higher frequency components from the output of said detector, means for degeneratively controlling the gain of said auxiliary channel in response to certain other and lower frequency components from said detector and means for controlling the gain of said main amplifier channel in accordance with he magnitude of the filtered and degenerated output potential of said detector.

4. In a direction finding system for translating modulated carrier signals between relatively fixed points and naving a rotating directional characteristic antenna with predetermined maximum and minimum relative intensities for each revolution of said characteristic, a main amplifier channel for said signals, indicator means operatively connected to said main channel for indicating rotational positions relative to said minimum intensities, an uxiliary amplifier channel for said signals, an envelope letector for said auxiliary channel, means for supplying ι gain control potential to said main amplifier channel n accordance with the output of said detector and amplitude modulation degenerative means operable in said uxiliary channel, said degenerative means comprising ι degenerative feedback loop having frequency selective iltering means incorporated therein.

5. In a direction finding system for translating modulated carrier signals between relatively fixed points and naving a rotating directional characteristic antenna with predetermined maximum and minimum relative intensities or each revolution of said characteristic, a main amplifier channel for said signals, indicator means operatively connected to said main channel for indicating rotational positions relative to said minimum intensities, an auxiliary implifier channel for said signals, an amplitude detector or said auxiliary channel, filter means for removing certain frequency components from the output of said letector, means for controlling the gain of said main amplifier channel in accordance with the magnitude of he filtered output of said detector, and means in said uxiliary channel responsive to modulation frequency components from said detector for degeneratively controlling said auxiliary channel in synchronism with the amplification therein of said modulated signal.

6. In a direction finding system for translating modulated carrier signals between relatively fixed points and having a rotating directional characteristic antenna with predetermined maximum and minimum relative intensities for each revolution of said characteristic, a main amplifier channel for said signals, indicator means operatively connected to said main channel for indicating rotational positions relative to said minimum intensities, an auxiliary amplifier channel for said signals, an amplitude detector for said auxiliary channel, filter means for removing carrier frequency components from the output of said detector, means for degeneratively controlling said auxiliary channel in response to the modulation components from said detector produced by said rotating directional characteristic, and means for controlling the gain of said main amplifier channel in accordance with the magnitude of the filtered and degenerated output potential of said detector.

7. In a direction finding system for translating modulated carrier signals between relatively fixed points and having a rotating directional characteristic antenna with predetermined maximum and minimum relative intensities for each revolution of said characteristic, a main amplifier channel for said signals, indicator means operatively connected to said main channel for indicating rotational positions relative to said minimum intensities, an auxiliary amplifier channel for signals characterized by said modulated signals, means for supplying automatic gain control to said main amplifier channel in accordance with the amplified signals from said auxiliary channel, said auxiliary channel comprising an amplifier, a detector having the output of said amplifier applied thereto, a filter selectively passing the frequencies of the variations of said relative intensities, and means applying the output of said filter to said amplifier in a degenerative sense.

References Cited in the file of this patent

UNITED STATES PATENTS

| | | |
|---|---|---|
| 1,976,457 | Ohl | Oct. 9, 1934 |
| 2,183,206 | Stone | Dec. 12, 1939 |
| 2,214,608 | Bull | Sept. 10, 1940 |
| 2,275,389 | Feldman | Mar. 3, 1942 |
| 2,303,358 | Hoover | Dec. 1, 1942 |
| 2,319,663 | Crowley | May 18, 1943 |
| 2,480,842 | Farnsworth | Sept. 6, 1949 |
| 2,498,839 | Hayward | Feb. 28, 1950 |